United States Patent [19]

Lo

[11] Patent Number: 5,785,142
[45] Date of Patent: Jul. 28, 1998

[54] BRAKE OIL LEVEL SAFETY DEVICE FOR MOTOR

[76] Inventor: Chih-Chun Lo, P.O. Box 372, Hsin-Chu, Taiwan

[21] Appl. No.: 689,380

[22] Filed: Aug. 7, 1996

[51] Int. Cl.[6] ................................................ G01F 23/00
[52] U.S. Cl. .................. 180/271; 73/304 R; 340/620; 340/450.1; 188/1.11 E
[58] Field of Search ........................ 180/271; 73/304 R; 340/450.1, 450.2, 450.3, 618, 620, 450; 188/1.11 E, 151 A

[56] References Cited

U.S. PATENT DOCUMENTS

| | | | |
|---|---|---|---|
| 3,894,240 | 7/1975 | Rose | 340/620 |
| 4,244,385 | 1/1981 | Hotine | 340/620 |
| 4,371,790 | 2/1983 | Manning et al. | 73/304 R |
| 4,600,844 | 7/1986 | Atkins | 340/620 |
| 4,952,914 | 8/1990 | Mueller | 73/304 R |

Primary Examiner—Paul N. Dickson

[57] ABSTRACT

A brake oil level safety device having a control circuit connected in series between the ignition system of a motor vehicle and the battery power supply thereof, the control circuit having a grounding conductor and two oil level detecting conductors mounted in the brake oil cup of the oil brake system of the motor vehicle to detect the level of brake oil in the brake oil cup, the control circuit being induced to turn on a yellow indicator light when the level of brake oil in the brake oil cup drops below the upper oil level detecting conductor above the lower oil level detecting conductor, or to turn on a red indictor light and cut off power supply from the ignition system when the level of brake oil in the brake oil cup drops below the upper oil level detecting conductor and the lower oil level detecting conductor.

1 Claim, 3 Drawing Sheets

BRAKE OIL LEVEL SAFETY DEVICE FOR MOTOR

BACKGROUND OF THE INVENTION

A variety of oil brake systems have been developed and used in motor vehicles for slowing down or stopping movement. When the brake fluid in the brake oil cup of the oil brake system of a motor vehicle drops below a critical level, a brake failure will occur. U.S. Pat. No. 5,501,294, issued to the present inventor, discloses a brake oil level safety device for motor vehicles which automatically cuts off power supply from the ignition system when the fluid level of the brake fluid in the brake oil cup of the oil brake system of the motor vehicle drops below a critical level. This structure of brake oil level safety device, as shown in FIG. 1, comprises a microswitch 4 mounted on the outside wall of the brake oil cup 1 of a motor vehicle brake system and connected in series between the ignition system and the battery power supply of the motor vehicle, a cover 2 pivotably connected to the brake oil cup 1 by a pivot 23 and having a downward guide rod 21 suspended in the brake oil cup 1 and terminating in a disk 22, a float 3 mounted around the guide rod 21 and moved in the brake oil cup 1 between the disk 22 and the cover 2. When the brake oil cup 1 is filled up with the brake oil, the float 3 is moved upwards to lift the cover 2 from the microswitch 4, causing the microswitch 4 to be switched on. On the contrary, when the float 3 is moved downwards from the cover 2 and the cover 2 is covered on the brake oil cup 1, the microswitch 4 is switched off to cut off power supply from the ignition system. Because the oil level detecting mechanism is a mechanical structure, it is less sensitive and less stable.

SUMMARY OF THE INVENTION

It is one object of the present invention to provide a brake oil level safety device for motor vehicles which detects the level of brake oil in the brake oil cup of the oil brake system of the motor vehicle, and turns on an indicator light when the level of brake oil in the brake oil cup drops below a predetermined level above the safety critical range. It is another object of the present invention to provide a brake oil level safety device which uses an electronic circuit to positively and accurately detect the level of brake oil in the brake oil cup of the oil brake system of the motor vehicle. According to the preferred embodiment of the present invention, the brake oil level safety device comprises a control circuit connected in series between the ignition system of a motor vehicle and the battery power supply thereof, the control circuit having a grounding conductor and two oil level detecting conductors mounted in the brake oil cup of the oil brake system of the motor vehicle to detect the level of brake oil in the brake oil cup. The control circuit is induced to turn on a yellow indicator light when the level of brake oil in the brake oil cup drops below the upper oil level detecting conductor above the lower oil level detecting conductor. The control circuit is induced to turn on a red indictor light and cut off power supply from the ignition system when the level of brake oil in the brake oil cup drops below the upper oil level detecting conductor and the lower oil level detecting conductor. The yellow indicator light and the red indicator light are turned off, and a green indicator light is turned on when the level of brake oil in the brake oil cup is maintained within the normal range.

DETAILED DESCRIPTION OF THE PREFERRED EMBODIMENT

Figure 1:
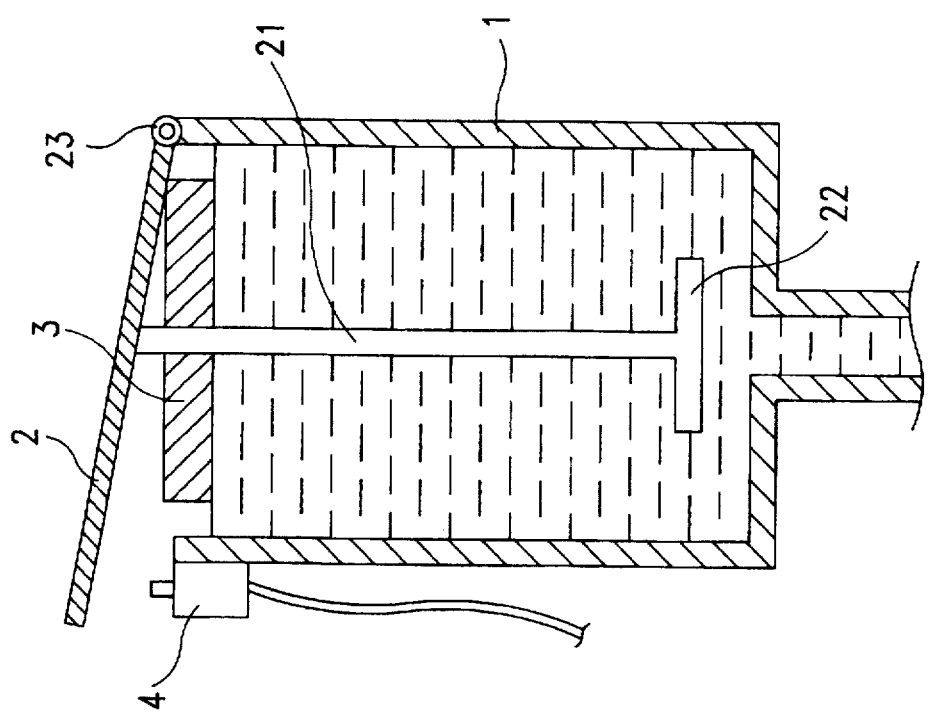
FIG. 1 is sectional view of a brake oil level safety device for motor vehicles installed in a brake oil cup according to the prior art.
Figure 2:
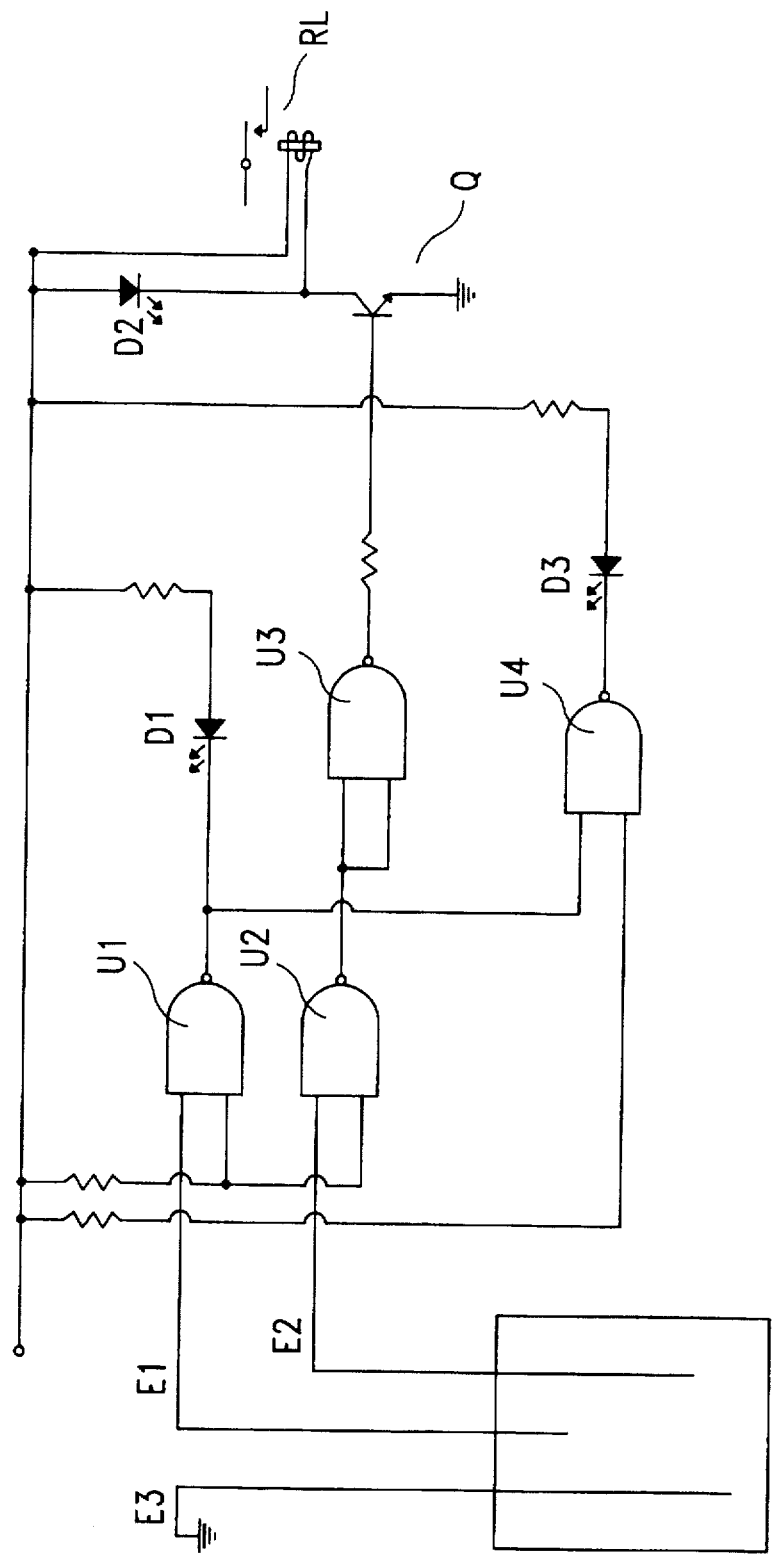
FIG. 2 is a circuit diagram of a detection control circuit according to the present invention.

Referring to FIG. 2, the detection control circuit of a brake oil level safety device for motor vehicles in accordance with the present invention comprises an upper oil level detecting conductor E1, a lower oil level detecting conductor E2, a grounding conductor E3, a first NOT-AND gate U1, a second NOT-AND gate U2, a third NOT-AND gate U3, a fourth NOT-AND gate U4, a first LED (light emitting diode) D1, a second LED D2, a third LED D3, a transistor Q, and a relay RL.

The first NOT-AND gate U1 having an input end connected to the upper oil level detecting connector E1, the second NOT-AND gate U2 having an input end connected to the lower oil level detecting conductor E2, and the fourth NOT-AND gate U4 having an input end connected to the output end of the first NOT-AND gate U1. The first LED D1 connected to the output end of the first NOT-AND gate U1, the second LED D2 connected to the output end of the third NOT-AND gate U3 through the collector of the transistor Q. The first NOT-AND gate U1, the second NOT-AND gate U2, and the fourth NOT-AND gate U4 having a respective second input end respectively connected to the power supply. The fourth NOT-AND gate U4 having the output end conencted to the third LED D3. The third NOT-AND gate U3 having two input ends respectively connected to the output end of the second NOT-AND gate U2 and the output end connected to the base of the transistor Q, and the relay RL connected between the collector of the transistor Q and the power supply for control the ignition system.

Normally, the upper oil level detecting conductor E1 and the lower oil level detecting conductor E2 are respectively connected to the grounding conductor E3, the first NOT-AND gate U1 provides a high potential output to turn off the first LED D1, the second NOT-AND gate U2 is also electrically connected to provide a high potential output to the third NOT-AND gate U3, causing it to provide a low potential output, and therefore the transistor Q the relay RL do no work, and the ignition system operates smoothly.

When the brake oil level in the brake oil cup drops below the bottom end of upper oil level detecting conductor E1 above the bottom end of the lower oil level detecting conductor E2, the upper oil level detecting conductor E1 is at the high-potential status, the first NOT-AND gate U1 provides a low potential output to turn on the first LED D1, the lower oil level detecting conductor E2 is at the low-potential status, the second NOT-AND gate U2 provides a high potential output to the third NOT-AND gate U3, and the third NOT-AND gate U3 is connected to provide a low potential output to the transistor Q and the relay RL, and therefore the transistor Q and the relay RL do no work.

When the brake oil level in the brake oil cup drops below the bottom ends of the upper oil level detecting conductor E1 and the lower oil level detecting conductor E2, the upper oil level detecting conductor E1 and the lower oil level detecting conductor E2 are respectively turned to the high potential status, the first NOT-AND gate U1 provides a low potential output to turn on the first LED D1, the second NOT-AND gate U2 provides a low potential output to the third NOT-AND gate U3, and the third NOT-AND gate U3 is connected to provide a high potential output to the base of the transistor Q to turn on the second LED D2, therefore the relay RL is driven by the transistor Q to cut off the power supply from the ignition system.

In the aforesaid detecting control circuit, when the upper oil level detecting conductor E1 is at the low potential status and the lower oil level detecting conductor E2 is at the high potential status, it means the volume of the brake oil in the brake oil cup is not within the normal range, therefore the third NOT-AND gate U3 provides a high potential output to the base of the transistor Q to turn on the second LED D2, therefore the relay RL is driven by the transistor Q to cut off the power supply from the ignition system.

Figure 3:
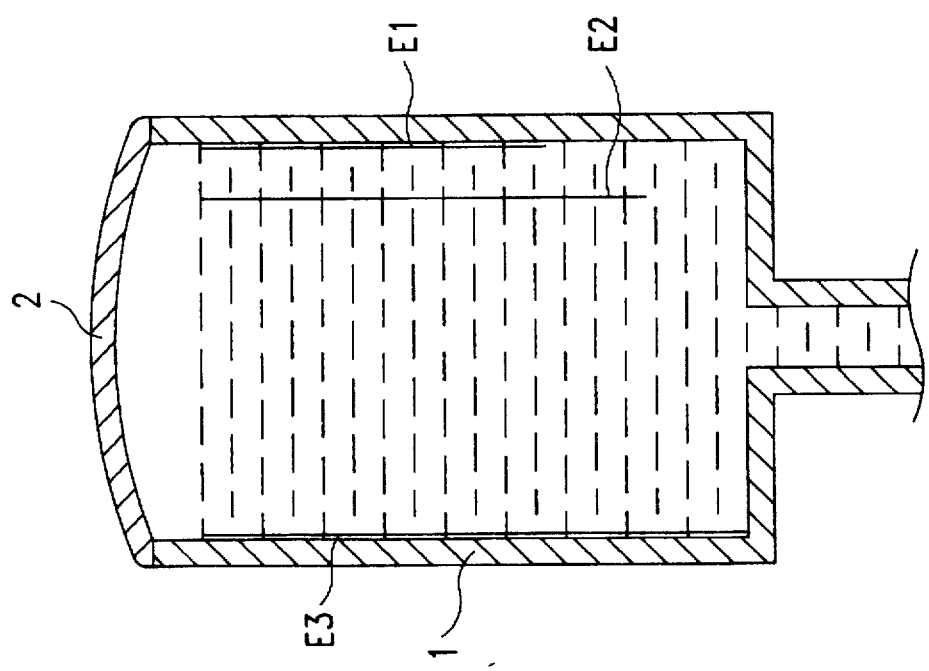
FIG. 3 is a sectional view of the present invention, showing the brake oil detection and engine control device installed in a brake oil cup.

FIG. 3 shows the upper oil level detecting conductor E1, the lower oil level detecting conductor E2, and the grounding conductor E3 mounted in the oil cup 1, which is covered with a cover 2. As indicated, the bottom ends of the upper oil level detecting conductor E1, the lower oil level detecting conductor E2, and the grounding conductor E3 are respectively disposed at different elevations in the oil cup 1. Because the output ends of the upper oil level detecting conductor E1 and the lower oil level detecting conductor E2 are connected to the first NOT-AND gate U1 and the second NOT-AND gate U2 respectively (referring to FIG. 2 again), only the aforesaid three different conditions will occur alternatively. The first LED D1 is preferably a yellow color LED connected in series to the output end of the first NOT-AND gate U1. The second LED D2 is preferably a red color LED connected to the output end of the third NOT-AND gate U3 through the transistor Q. When the oil level in the brake oil cup is within the normal range, a green color back light is shown in the instrument board; when the oil level in the brake oil cup drops below the bottom end of the upper oil level detecting conductor E1 above the bottom end of the lower oil level detecting conductor E2, a yellow color light is produced (the first LED is turned on); when the oil level in the brake oil cup drops below the upper oil level detecting conductor E1 and the lower oil level detecting conductor E2, a red color light is produced (the second LED is turned on), and at the same time the transistor Q and the relay RL are turned on to cut off power supply from the ignition system.

What the invention claimed is:

1. A brake oil level safety device mounted in a brake oil cup of an oil brake system of a motor vehicle and connected in series between an ignition system and a battery power supply of said motor vehicle to detect the level of brake oil in said brake oil cup and to cut off power supply from said ignition system when the level of brake oil in said brake oil cup drops below a predetermined range, the device comprising a grounding conductor mounted in said brake oil cup, a lower oil level detecting conductor mounted in said brake oil cup above the elevation of said grounding conductor, an upper oil level detecting conductor mounted in said brake oil cup above the elevation of said lower oil level detecting conductor, a first NOT-AND gate having an input end connected to said upper oil level detecting conductor, a second NOT-AND gate having an input end connected to said lower oil level detecting conductor, a fourth NOT-AND gate having an input end connected to the output end of said first NOT-AND gate, a first light emitting diode connected to the output end of said first NOT-AND gate, a second light emitting diode connected to the output end of a third NOT-AND gate through the collector of a transistor, said first NOT-AND gate, said second NOT-AND gate, and said fourth NOT-AND gate having a respective second input end respectively connected to said power supply, said fourth NOT-AND gate having the output end connected to a third light emitting diode, said third NOT-AND gate having two input ends respectively connected to the output end of said second NOT-AND gate and the output end connected to the base of said transistor, and a relay connected between the collector of said transistor and said power supply.

* * * * *

UNITED STATES PATENT AND TRADEMARK OFFICE
CERTIFICATE OF CORRECTION

PATENT NO. : 5,785,142
DATED : 28 JULY 1998
INVENTOR(S) : CHIH-CHUN LO

It is certified that error appears in the above-identified patent and that said Letters Patent is hereby corrected as shown below:

On title page, item [76], delete the words "P.O. Box 372, Hsin-Chu, Taiwan" and insert therefor the words --15-13F, No. 4, Hsi Ning S. Road, Taipei, Taiwan, R.O.C.--

Signed and Sealed this

Twenty-seventh Day of April, 1999

Attest:

Q. TODD DICKINSON

Attesting Officer

Acting Commissioner of Patents and Trademarks